UNITED STATES PATENT OFFICE.

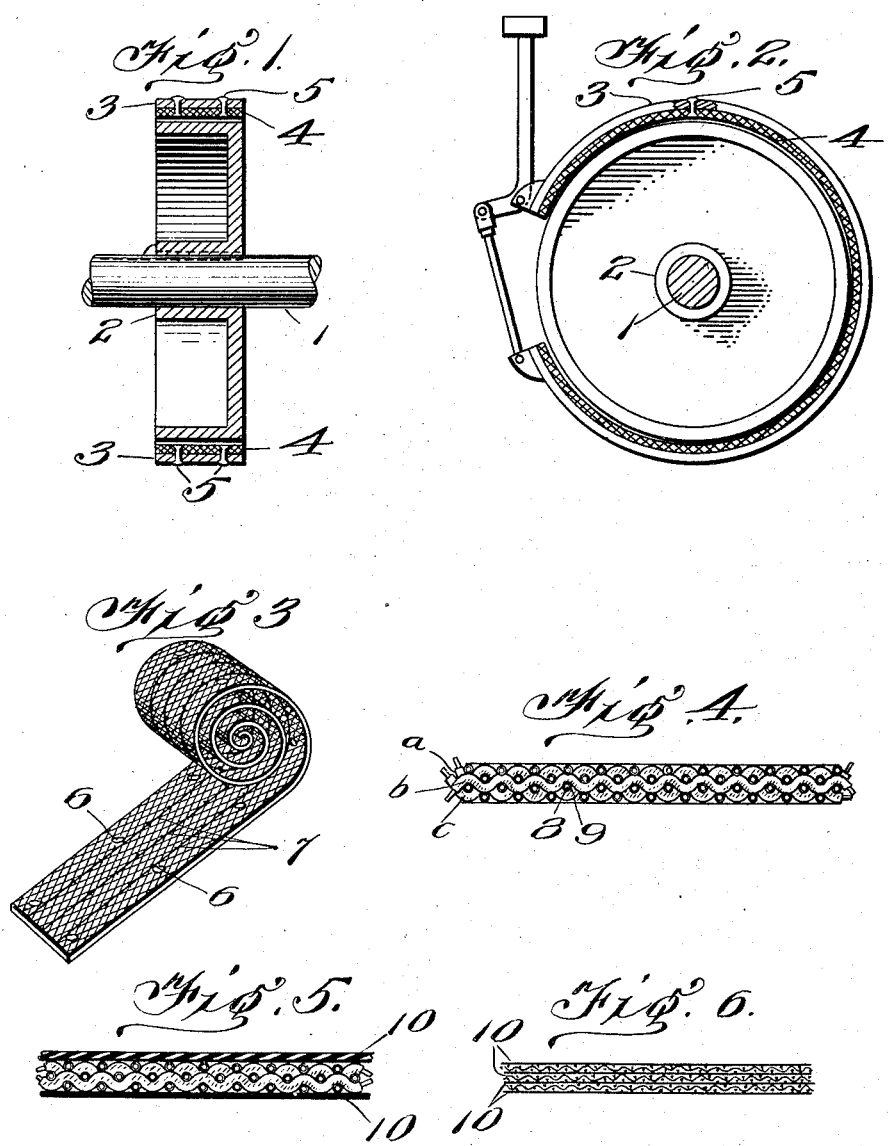

WILLIAM T. BONNER, OF TRENTON, NEW JERSEY, ASSIGNOR TO THE BRAKE LINERS COMPANY, OF WASHINGTON, DISTRICT OF COLUMBIA, A CORPORATION OF DELAWARE.

BRAKE AND BRAKE-LINER.

980,481.      Specification of Letters Patent.      Patented Jan. 3, 1911.

Application filed July 28, 1909. Serial No. 510,057.

*To all whom it may concern:*

Be it known that I, WILLIAM T. BONNER, a citizen of the United States, residing at Trenton, in the county of Mercer and State of New Jersey, have invented certain new and useful Improvements in Brakes and Brake-Liners, of which the following is a specification.

This invention relates to brakes and brake liners; and it comprises a braking element having a liner comprising an asbestos fabric, advantageously reinforced with metal strands, containing an interiorly incorporated cementing material and in several plies united or cemented together; and it further comprises said liner; all as more fully hereinafter set forth and as claimed.

For automobile brakes and other high duty braking purposes requiring flexibility of engagement of the braking means with the possibility of a fully graduated series of engagements between locking engagement and no-engagement, asbestos is an efficient, body-giving element since it combines good frictional qualities for this purpose with a number of other desirable properties. Being unaffected by heat and being but little conductive therefor, heat developed on the braking face does not damage it and is not propagated elsewhere to any substantial extent. And in the form of fabric, it displays a type of resilience desirable in securing graduated engagements of the braking means. Unfortunately however the tensile strength of asbestos is but low, asbestos threads, as threads, being comparatively weak with comparatively little tendency to lock or felt together, though the ultimate asbestos fibers themselves have considerable strength. For a brake liner it is therefore practically impossible to employ an asbestos fabric alone, some form of reinforcement or strengthening being necessary. For instance, the asbestos fibers or threads may be spun or knit around metal wires or filaments and these so-coated wires woven into fabric form. Such a compound fabric however while possessing considerable tensile strength does not well resist frictional wear, there being a tendency for the asbestos fibers to break away locally where exposed to wear. There is of course in such a fabric no great amount of adhesion or engagement between the asbestos fibers themselves or between the fibers and the core wire. It is therefore desirable that a further strengthening of the compound fabric be given by providing a positive type of union between the fibers themselves and the fibers and wires. While the former effect may be produced to a limited degree by "frictioning" the compound fabric, that is, by coating it with a fluent rubber composition, in practice this does not work as well as can be desired.

Rubber compositions are not particularly fluent when of strengths suitable for the purpose of giving a "frictioning" layer of much thickness and do not penetrate the fabric far, even with more fluid compositions, without special means being adopted to that end. The asbestos fibers are very fine so that it is difficult for thick rubber compositions to penetrate between them. And in any event, the use of much rubber is commercially not very practicable because of its great cost. Practically, the effect of frictioning is confined to the surface and while this superficial effect is desirable as cementing together the fibers where exposed to wear, the full efficiency of the reinforcement by the metal is not secured, nor is full advantage taken of the strength of the remaining asbestos fibers. Unless the cementing body thoroughly penetrates the fabric, there is no more than a frictional engagement of the wire with the asbestos of the body of the fabric.

By using a permeating cementing body, either in addition to or in exclusion of, the rubber, and especially where certain expedients hereinafter set forth are resorted to, a much more desirable type of liner is secured. With a permeating cementing body not only are the superficial fibers anchored together but also the interior fibers; while such fibers, in turn, are caused to have a positive union with the core wire. The whole fabric is made a unitary mass.

While most of the cementing adhesives do not have much tensile strength when existing as a body of any considerable mass, yet in the form of thin films, layers or columns they have considerable strength. On the other hand while, as stated, asbestos threads themselves are not very strong yet the ultimate fibers are possessed of considerable strength. Therefore by producing a close fabric of asbestos and wire, having the several fibers, threads and wires close together with minute interspaces filled with a cementing adhesive, full advantage is taken of the strength of the asbestos and wire and the compound fabric as a whole has a strength greater than the sum of the strengths of these components. The individual asbestos fibers which, as stated, have considerable strength are no longer free to slide over or move relatively to each other but are locked in position by relatively strong, cohering thin films of the cementing adhesive. Even without a wire-reinforcement, an asbestos fabric so impregnated has relatively great mechanical strength; sufficient to adapt it for many braking purposes. But the metal-reinforced material is much better adapted for most purposes. With a fabric so reinforced, there is a direct locking of the asbestos and wire together.

While a single ply of a fabric produced as described may be used for some purposes, it is much better to use a plurality of plies. With a plurality of plies a resilience can be obtained which it is impossible to get with a single ply and the communication of stresses between the braking face of the liner and the holding element therefor is very much better. A single ply fabric cannot well secure both a good engagement with the holding element and a good engagement with the surface to be braked, whereas a laminated fabric can easily secure good engagement with both.

Many impregnating adhesives may be employed, but in practice in the present embodiment of this invention I prefer a pitchy or asphaltic adhesive of such a nature that it is fairly heat-resistant while also being flexible. A certain amount of flexibility is necessary to enable the brake liner to take full advantage of its resiliency while heat resistant qualities are desirable to prevent injurious effects from the heat developed in braking. As best adapted for my present purposes, in this embodiment of my invention, I regard certain asphaltic residua from petroleums having an asphalt base. These residua or still bottoms on being blown with air while hot become converted into pitchy bodies eminently suitable for my purposes. The original residue are less well adapted. On blowing the residua, the material oxidizes and its melting temperature rises. The melting point may vary from 200° to 260° F. The material with the higher melting point is better for my purposes. On melting the pitchy body becomes thinly liquid so that it can be used as a good impregnant, giving a good, uniform and thorough impregnation.

Impregnation can be easily effected by dipping the fabric or by passing it through a bath of the molten impregnant, squeezing out excess in the well understood way. A sheet of asbestos fabric may be impregnated, cut into strips of appropriate size and these strips united to form a liner of any desired number of plies by stitching with thread or wire. Rivets may be used but are not necessary. Or the sheet may be folded upon itself to make as many plies as may be necessary, and these plies then stitched together.

The use of some rubber or rubber composition in the structure is often advantageous. By facing or "frictioning" the plies with a rubber composition prior to assemblage and then uniting and curing under pressure, the facing layers of rubber unite and become integral and firmly unite the proximate layers or plies of fabric. These intercalated layers of rubber add much to the resilience of the liner as a whole and therefore to the practicability of securing adjusted degrees of engagement in braking.

The impregnated reinforced fabric, with or without the rubber intercalated between the plies, may be utilized as a braking element by securing it to any suitable holding member adapted to support it in such a manner as to expose the flat face, or an outer ply, opposite the surface to be braked. In such position the outer face acts as a braking member while the asbestos, wire and adhesive coöperate in transmitting strains upon the face to and through the body to the holding element. Any local overheating merely burns out locally a little of the cementing adhesive and does no harm. The asbestos and the adhesive are both substantially non-conductive for heat, and the separated strands of metal, not being in mutual contact, do not act as heat-transmitters. The pitchy adhesive in the braking face adds materially to the coefficient of friction. Either the true asbestos or the Canadian chrysotile may be employed. "Mineral wool" is less suitable.

In producing the compound laminated liner, it is advantageous to use heavy pressure at some stage of the operation while the adhesive is still fluent as this brings the fibers and wire into closer approximation and reduces the thickness of the uniting films or layers of adhesive and, thereby, increases the strength of such films.

In making the primary fabric, suitable wire may be covered with asbestos fibers by spinning or otherwise and the coated wire woven or knit into fabric form. The impregnation is best postponed till after making the fabric, it being less convenient and suitable to impregnate the covered wire prior to weaving. A cheap and simple way of operating however is to paint or varnish the wire with a paint of comminuted or flock asbestos and the stated pitchy adhesive, and then weave. The fabric so produced is however by no means as desirable as that produced from good long fiber asbestos spun directly upon the wire and the necessity of weaving hot or in a warm condition is inconvenient. The complete liner whether laminated or single ply is finally stitched.

Each ply of the primary fabric may be dipped in the fluent adhesive in the described manner, passed through wringing rolls and allowed to dry in the air. Or the hot, warm plies may be directly assembled. Where the rubber is desired in the structure, the sheet of fabric after impregnation and pressing, which, in this instance, should be under considerable pressure, may be given a coating of fluent rubber composition on one or both sides and then be folded into shape to produce a number of plies. Or the plies may be cut to shape and assembled. In either case, the assembled plies should next be vulcanized in a suitable press under pressure. A facing layer of rubber on the face of the liner to be exposed to the braking surface is often desirable where the intercalated rubber layers are omitted. The complete liner may be assembled with any suitable holding element, as the strap of a strap brake, by riveting, bolting or the like to form a complete brake.

In the accompanying illustration I have shown, more or less diagrammatically, certain embodiments of the described invention. In this showing, Figure 1 is a vertical transverse section of a brake spool and brake provided with the described asbestos liner; Fig. 2 is an elevation, partly broken away, at right angles to the showing of Fig. 1; Fig. 3 is a view in perspective of a portion of a coil of laminated liner ready for application; Fig. 4 is a section on an enlarged scale of such a liner; Fig. 5 is a similar view showing the liner carrying a "frictioning" of rubber; and Fig. 6 shows a liner with intercalated rubber layers spacing apart and uniting the several fabric plies.

In Figs. 1 and 2, shaft 1 of some element to be braked, as an automobile, carries a hub or spool 2 having a rim or periphery adapted for braking. With this engages strap brake 3 provided with the described brake liner 4 of impregnated asbestos, secured thereto in any suitable way, as by bolts or rivets 5. Fig. 3 shows a coil or roll of this liner ready for application to or assemblage with the holding element (3). Perforations 6 are for rivets or bolts. Stitches 7 are of thread or wire. In Fig. 4, a 3-ply fabric is shown, the plies being lettered a, b and c. Element 8 in each ply is a wire covered with a coating 9 and woven into a fabric with similar covered wire. The plies are saturated, as stated, with a cementing adhesive.

In Fig. 5, the liner of Fig. 4 is shown provided with a "frictioning 10" of rubber, applied either as a fluid composition or as a more or less fluent solid rubber composition applied under pressure and heat. If so desired, as stated, the rubber may occur between the plies of fabric, as shown in Fig. 6 where there are intercalated layers 10 of rubber or rubber composition. Preferably the pitchy impregnant used is one having a high melting point, say between 250° and 260° F. and a high point of ignition, say 720° to 750° F. A blown residuum from Texas petroleum of these characteristics may be readily obtained. Many other cementing adhesives such as viscose, gum pontianak, balata, gutta, etc., may be employed. Drying oils such as linseed oil, tung or wood oil, sunflower oil, nut oil, corn oil, etc., may be employed, but this I do not claim specifically herein, it forming the matter of a co-pending application, Serial No. 503,625, filed June 22, 1909. Drying oils mixed with sodium silicate solution ("water glass") or other mineral fluent binder, are also suitable. In the present embodiment of my invention, however, I prefer the described pitchy impregnant from petroleum residues. Other asphaltic or pitchy bodies may be employed, but I regard this pitch residue as best for the present purposes.

The petroleum residue of the character described comprises many valuable properties for the present purposes. Having been made at a high temperature it is not much affected by the braking temperatures, and it is flexible, allowing the liner to yield and bend somewhat; a very convenient property in assembling with the holding element. This softness or fluency also allows a yielding under the braking pressure, in addition to the resiliency due to the rubber, when used, thereby at once giving better engagements and prolonging the life of the liner. It has still other valuable properties for the present purpose depending on the fact that it melts under heat. This fusibility does not cause it to flow away in use since the liner is made under heavy pressure, which may be up to a couple of thousand pounds, so that no more is left in the fabric than can be capillarily held, but it does allow a replenishment of that in the braking face in case of a little charring so that the superficial asbestos fibers are not left unsupported. It is too bad a conductor of heat, as is the asbestos also, to allow permeation of heat inward any great distance and cause the body to flow as a mass, but that immediately below the braking fibers will so flow. In addition, for the present purposes, the described pitchy body has the advantage of a high coefficient of friction, being sticky in character, and also, because of this stickiness, it serves well to unite the plies together. In impregnating a liner fabric with linseed oil, it is best to allow the several plies to be subsequently united to dry before uniting as giving a quicker drying. Drying is an oxidation phenomenon depending in part on contact with the air and it is consequently quicker to dry the unassembled plies rather than the complete liner. But when so dried to completion, or nearly to completion, the drying oils have little stickiness or adhesive power left so that the assembled plies are not cemented together between their faces thereby as thoroughly as is desirable. With the pitchy impregnant, on the other hand, a good coherence between the layers or plies is secured so that such pitchy matter serves at once as an impregnant and as a cement between the plies, for this latter purpose having part of the functions of the rubber.

Where the ply-cementing function of the pitch is desired, it is best to modify somewhat the method of producing the liner. The several plies should be first impregnated and subjected to pressure to cause the asbestos and wire to lie close together, spaced and united by films of the impregnant of minimal thickness. As stated, in such thin filmiform condition, it gives a maximum strength. After impregnation, the several plies may each be given a squeezing pass through a roller, or the sheet which is to be folded on itself to form the plies, may be given such a squeezing pass. Then the several plies or the sheet may be given a facing coat of the pitchy body, prior to assemblage, the plies assembled or the sheet folded, and once more pressed. Operating in this manner, the intercalated layers of rubber are best omitted, though the laminated fabric so produced may be given an outer coat of rubber. In the drawing, the diagrammatic showing of Fig. 6 may be taken to represent this pitch-impregnated, pitch-cemented liner, layers 10 being intercalated cementing layers of pitch. Where great resiliency in the liner is desired, however, intercalated layers of rubber are preferable. The pitchy substance, while serving well as a ply-cement, is not so resilient as rubber.

While the wire used for the basis of the liner may be coated with asbestos in other ways, it is best covered therewith by spinning since the spun-coated wire presents the asbestos fibers arched around the wire in a way which makes the structure mechanically stronger. Wire coated with flock or powdered asbestos by the use of an adhesive is much less suitable for high-grade liners.

The spun-coated wire fabric presents substantially a wire fabric in which each wire is spaced and separated from the other wires by a layer of asbestos, or asbestos and adhesive, and is therefore out of thermal contact. The heat of a wire exposed in braking engagement is therefore not propagated to the other wires of the fabric from which it is spaced by the spun coating. Where greater strength is required and the propagation of heat is not important, the asbestos coating may be omitted, but in the present embodiment of my invention such a spun coating is employed.

What I claim is:—

1. A brake comprising a holding member and a liner held therein, said liner comprising a layer of asbestos fabric impregnated with a pitchy petroleum residue.

2. A brake comprising a liner comprising a layer of asbestos fabric impregnated with a pitchy petroleum residue and having a wire reinforcement.

3. A brake comprising a liner comprising a layer of wire-reinforced asbestos fabric impregnated with a pitchy petroleum residue and a holding element for said liner.

4. In a braking element, a plurality of plies of fabric composed of interwoven, asbestos-coated wires, said fabric plies being impregnated with a pitchy petroleum residue.

5. In a braking element, a friction layer comprising a layer of fabric composed of interwoven, asbestos-coated wires and impregnating pitchy petroleum residue.

6. In a braking element, a plurality of piles of wire-reinforced asbestos fabric, said plies being impregnated with a pitchy petroleum residue and said plies being cemented together.

7. In a braking element, a plurality of plies of wire-reinforced asbestos fabric, said plies being impregnated with a pitchy petroleum residue and the outer ply being faced with rubber composition.

8. In a brake, the combination of a holding element and a liner comprising one or more plies of wire-reinforced asbestos impregnated with a pitchy petroleum residue and one or more plies of rubber.

9. In a braking element, a plurality of assembled plies comprising one or more plies of wire-reinforced asbestos impregnated with a pitchy petroleum residue and one or more plies of rubber.

10. In a braking element, a plurality of assembled plies of fabric composed of interwoven, asbestos-coated wires, said plies being impregnated with a pitchy petroleum residue, and intercalated layers of a rubber composition spacing and uniting said plies, said assemblage of plies carrying a facing layer of rubber composition.

11. In a band brake, the combination with a holding element of a brake band comprising a plurality of plies of interwoven, asbestos-coated wires, said plies being impregnated with a pitchy petroleum residue.

12. In a band brake, the combination with a holding element of a brake band comprising a plurality of plies of interwoven, asbestos-coated wires, said plies being impregnated with a pitchy petroleum residue, and also comprising one or more layers of rubber composition.

13. A brake band comprising a plurality of plies of a fabric composed of interwoven, asbestos-coated wires, said fabric being impregnated with a pitchy residue from petroleum, and one or more plies of rubber composition, said band being stitched.

14. In a brake, a liner comprising a plurality of plies of interwoven, asbestos-coated wire fabric, said fabric being impregnated with a pitchy petroleum residue and said plies being spaced and united by a cementing body.

15. In a brake, a liner comprising a plurality of plies of interwoven, asbestos-coated wire fabric, said fabric being impregnated with a pitchy petroleum residue and said plies being spaced and united by cementing rubber composition.

In testimony whereof, I affix my signature in the presence of witnesses.

WILLIAM T. BONNER.

Witnesses:
 Wm. A. Furman,
 W. A. Foote.